United States Patent
Dey et al.

(10) Patent No.: US 10,915,910 B2
(45) Date of Patent: Feb. 9, 2021

(54) PASSIVE ANALYSIS OF SHOPPING BEHAVIOR IN A PHYSICAL SHOPPING AREA USING SHOPPING CARTS AND SHOPPING TRAYS

(71) Applicant: International Business Machines Corporation, Armonk, NY (US)

(72) Inventors: Kuntal Dey, New Delhi (IN); Vijay Ekambaram, Tamilnadu (IN); Seema Nagar, Bangalore (IN); Swati Rallapalli, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1113 days.

(21) Appl. No.: 14/963,817

(22) Filed: Dec. 9, 2015

(65) Prior Publication Data

US 2017/0169440 A1  Jun. 15, 2017

(51) Int. Cl.
| | | |
|---|---|---|
| *H04W 4/80* | (2018.01) | |
| *H04W 4/021* | (2018.01) | |
| *H04W 4/33* | (2018.01) | |
| *H04W 4/029* | (2018.01) | |
| *G06Q 30/02* | (2012.01) | |
| *G06Q 30/06* | (2012.01) | |

(52) U.S. Cl.
CPC ..... *G06Q 30/0201* (2013.01); *G06Q 30/0639* (2013.01); *H04W 4/021* (2013.01); *H04W 4/029* (2018.02); *H04W 4/33* (2018.02); *H04W 4/80* (2018.02)

(58) Field of Classification Search
CPC ....... G06Q 30/06; G06Q 30/02; H04W 4/043; H04W 4/80
See application file for complete search history.

(56) References Cited

U.S. PATENT DOCUMENTS

| | | |
|---|---|---|
| 6,484,939 B1 | 11/2002 | Blaeuer |
| 7,132,926 B2 | 11/2006 | Vaseloff et al. |
| 7,219,838 B2 | 5/2007 | Brewster et al. |
| 7,443,295 B2 | 10/2008 | Brice et al. |
| 7,660,747 B2 * | 2/2010 | Brice ................ G06Q 30/0635 705/14.63 |
| 2006/0219780 A1 * | 10/2006 | Swartz ................ G07G 1/0054 235/383 |

(Continued)

OTHER PUBLICATIONS

"The Influence of Shopping Carts on Customer Behavior in Grocery Store", By Udo Wagner, ClausEbster, Ulrike Eske and Wolfgang Weitzl; Marketing ZFP—Jan. 2014 (Year: 2014).*

(Continued)

*Primary Examiner* — Pan G Choy
(74) *Attorney, Agent, or Firm* — Fleit Intellectual Property Law; Gary Winer (57) ABSTRACT

Shopping related data is obtained by using a weight sensor on a shelf to determine a reduction in weight of product on the shelf, and noting the time, and then detecting weight added to a near-by located shopping cart using a sensor, and noting the time. This data is communicated to a processor, which determines a probability that a product has been moved from the shelf to the cart if the reduction in weight upon the shelf is the same weight as the increase in weight upon the cart. Using this data, it is possible to determine a time interval during which a shopper considered purchasing the product.

13 Claims, 4 Drawing Sheets

(56) References Cited

U.S. PATENT DOCUMENTS

| | | | |
|---|---|---|---|
| 2007/0078869 A1* | 4/2007 | Carr | G06Q 30/02 |
| 2008/0283599 A1* | 11/2008 | Rasband | G06K 7/10079 |
| | | | 235/439 |
| 2009/0221301 A1* | 9/2009 | Riley | G08B 21/023 |
| | | | 455/456.5 |
| 2011/0208569 A1* | 8/2011 | Fano | G06N 20/00 |
| | | | 705/14.1 |
| 2011/0208613 A1 | 8/2011 | Parham | |
| 2011/0279252 A1* | 11/2011 | Carter | B60T 7/16 |
| | | | 340/426.11 |
| 2011/0288938 A1* | 11/2011 | Cook | G06Q 30/0251 |
| | | | 705/14.66 |
| 2012/0284132 A1* | 11/2012 | Kim | G06Q 20/18 |
| | | | 705/20 |
| 2013/0085888 A1* | 4/2013 | Kim | G06Q 30/0601 |
| | | | 705/26.8 |
| 2013/0103539 A1* | 4/2013 | Abraham | G06Q 30/0633 |
| | | | 705/26.8 |
| 2013/0132180 A1* | 5/2013 | Aihara | G06Q 30/0222 |
| | | | 705/14.23 |
| 2014/0108195 A1 | 4/2014 | Stawar et al. | |
| 2014/0125019 A1* | 5/2014 | Hannah | G06Q 10/08 |
| | | | 280/33.994 |
| 2015/0073899 A1* | 3/2015 | Carpenter | G06Q 30/0633 |
| | | | 705/14.49 |
| 2015/0161712 A1 | 6/2015 | Ponzetta et al. | |
| 2016/0203499 A1* | 7/2016 | Yamashita | G06Q 30/02 |
| | | | 705/7.29 |
| 2016/0259329 A1* | 9/2016 | High | G06Q 30/0633 |
| 2016/0300455 A1* | 10/2016 | Hutchings | G06Q 20/20 |
| 2016/0379074 A1* | 12/2016 | Nielsen | H04N 7/181 |
| | | | 348/143 |

OTHER PUBLICATIONS

"The Determinants of Consumers' Shopping Cart Abandonment", by Monika Kukar-Kinney, University of Richmond, Angeline Close Scheinbaum, Clemson University, Journal of the Academy of Marketing Science, Apr. 2009. (Year: 2009).*

Ava Retail, http://www.avaretail.com/avaretail/, last visited on Nov. 4, 2015, pp. 1-12.

Shoppertrak, "Retail Analytics—Retail Traffic Solution", http://www.shoppertrak.com, last visited on Nov. 4, 2015, p. 1.

Mediacart, http://www.mediacart.com, last visited on Nov. 4, 2015, p. 1.

Point Inside, http://www.pointinside.com, last visited on Nov. 4, 2015, pp. 1-4.

Euclid Analytics, http://www.euclidanalytics.com, last visited on Nov. 4, 2015, p. 1.

Retailnext, http://retailnextnet/how-it-works, last visited on Nov. 4, 2015, pp. 1-4.

* cited by examiner

PASSIVE ANALYSIS OF SHOPPING BEHAVIOR IN A PHYSICAL SHOPPING AREA USING SHOPPING CARTS AND SHOPPING TRAYS

FIELD OF THE DISCLOSURE

The present disclosure generally relates to analyzing shopping behavior, and more particularly to capturing shopping behavior data using product weight, weight displacement events, and associated timing data.

BACKGROUND OF THE DISCLOSURE

U.S. Pat. No. 7,660,747 discloses a shopping cart including an inventory component for determining an inventory contained by the shopping cart, an identification component for associating a unique identity of the shopping cart, a correlation component of a modular computing device for correlating the inventory contained by the shopping cart with the unique identity of the shopping cart, and a communication component for conveying to a retailer system the correlation between the inventory and the unique identity of the shopping cart.

Rallapalli et al., Enabling Physical Analytics in Retail Stores Using Smart Glasses, MobiCom'14, Sep. 7-11, 2014, Maui, Hi., USA, ACM 978-1-4503-2783-1/14/09, discloses tracking of browsing in a physical environment using a combination of a first person vision enabled by smart glasses, and inertial sensing using both the glasses and a smartphone.

U.S. Pat. No. 6,484,939 discloses a shopping cart with a console for the input and display of consumer product information such as pricing, built into the handle of the shopping cart or as a retrofit application on existing handles. The console has a product information input device for numerical values such as product pricing and cost per unit. Space on the console is disclosed for a display panel for advertising. The console may be equipped with a bar code scanner as an alternate means of inputting consumer data.

U.S. Pat. No. 7,132,926 discloses a smart tray system includes a plurality of information tags and a plurality of communication devices, which can communicate with each of the information tags when the information tags are located in the proximity of the communication devices. Each information tag is attached to a food tray and contains information about the food tray and the food product contained therein. The information tags and the communication devices provide for tracking and updating the information about the food product contained in the food tray. An information tag can simply be a bar code label that carries information about an item to which it is attached. An information tag can also be a radio frequency tag (RF tag) that not only stores information about an item to which it is attached, but also is read/write capable.

U.S. Pat. No. 7,219,838 discloses facilitating a checkout at a shopping cart checkout station is provided, comprising the steps of inhibiting processing of items on the shopping cart in the event of a detection of a non-empty obscured section of the shopping cart, and processing the items upon receipt of a command input from an operator at the checkout station.

U.S. Pat. No. 7,443,295 discloses a read component for performing a proximity scan of the shopping cart, a locationing component for determining a location of the shopping cart within a store based on the scan, and a display component for displaying at least one advertisement for a product based on the location of the shopping cart within the store.

www.avaretail.com/avaretail states that optical, infrared, BLUETOOTH, NFC, directional, 3D, and gyroscopic sensor data are used in real-time to provide shopper data.

www.shoppertrak states that data is gathered from video footage and customer's mobile devices to provide information relating to shopper behavior, including how customers move throughout a store, where they linger, and where they are buying.

www.mediacart.com states that a computerized shopping cart is provided that assists shoppers, and delivers targeted communications at the point of purchase.

www.pointinside.com states that a system therein uses Hadoop, Data visualizations, iBeacon, Map/Reduce, NLP, Hive, iOS and Android, Python, and Java to provide a consolidated view of shoppers' behaviors with merchandising, store operations, marketing, and space planning data sources.

www.euclidanalytics.com states that a system uses an existing WiFi network to sense non personal Wi-Fi signals emitted by smartphones to measure how customers flow through a space, how long they stay, and how often they return.

www.retailnext.net states that it uses video cameras, WiFi and BLUETOOTH devices, guest WiFi, and other data sources to provide insight into shopper behaviors.

SUMMARY OF THE DISCLOSURE

In an embodiment of the disclosure, a method for obtaining shopping related data, comprises detecting, by at least one shelf weight sensor connected to a first shelf, a reduction in weight, of a first weight amount, of product upon the first shelf; determining a first shelf time at which the reduction in weight by the first weight amount took place, by a timing device; detecting, by a cart weight sensor connected to a first shopping cart, an increase in weight upon the first cart; determining a first cart time at which the increase in weight upon the first cart took place, by a timing device; communicating shelf data including the detected reduction in first weight amount and first shelf time, by a control module associated with the first shelf, to an electronic processor; communicating cart data including the detected increase in first weight amount upon the first cart and the first cart time, by a control module associated with the first cart, to the processor; and executing software stored on non-transitory media by the processor, to use the communicated shelf data and cart data to cause the processor to determine a probability that a product has been moved from the first shelf to the first cart if the reduction in weight upon the shelf is the same weight as the increase in weight upon the cart, and to determine a consideration time before purchasing based upon the difference in time between the first cart time and the first shelf time, wherein the consideration time is about the time taken by a shopper to consider whether to purchase a product upon the first shelf.

In various embodiments thereof, the method further includes electronically determining a location of the cart with respect to the first shelf, and increasing the probability that a product has been moved from the first shelf to the first cart if the first cart is located proximate the first shelf; the first cart communicates data using a short range wireless protocol; the processor forms part of central server; video data of shoppers is not used, and the first cart is associated with a particular shopper; and/or the software is further executed by the processor to determine the product contents of the first cart by using the determined probability that a product has been moved from the first shelf to the first cart, and accessing data pertaining to products on the first shelf.

In a further variation thereof, the method further includes detecting, by the at least one shelf sensor, a second reduction in weight, of the first weight amount, of product upon the first shelf; determining a second shelf time at which the second reduction in weight by the first weight amount took place, by the timing device; detecting, by the at least one shelf sensor, an increase in weight, of the first weight amount, upon the first shelf; determining a third shelf time at which the increase in weight upon the first shelf by the first weight amount took place, by the timing device, the third shelf time subsequent to the second shelf time; communicating further shelf data including the detected second reduction in the first weight amount and the increase in the first weight amount and determined second and third shelf times, by the control module associated with the first shelf, to the processor; communicating further cart data including data corresponding to no detected increase in weight upon the first cart of the first weight amount between the third shelf time and the second shelf time, by a control module associated with the first cart, to the processor; and executing software stored on non-transitory media by the processor, to use the communicated further shelf data and further cart data to cause the processor to determine a probability that a product has been moved from the first shelf, considered by a shopper, and returned to the first shelf, to determine a consideration time before product rejection based upon the difference in time between the third shelf time and the second shelf time.

In an embodiment of the preceding variation, the method further includes determining, by at least one receiver positioned proximate the first shelf, a distance to the first cart during the time interval between the third and second shelf times; determining, by the at least one receiver, a distance to a second cart during the time interval between the third and second shelf times; communicating the distance to the first cart and the distance to the second cart to the processor; and executing software stored on non-transitory media by the processor, to use the communicated distances to the first and second cart, to determine which of the first and second carts was closer to the first shelf during the time interval between the third and second shelf times, and to determine an increased probability that the shopper that returned product to the first shelf is associated with the cart that is determined to have been closer.

In variations thereof, the method further includes determining a location of at least one of the first cart and the second cart is based upon the processor using location data provided by a mobile phone of a shopper associated with the at least one of the first cart and the second cart.

In another variation thereof, the method further includes communicating additional cart data including data corresponding to no detected increase in weight upon a second cart, of the first weight amount, between the third shelf time and the second shelf time, by a control module associated with the second cart, to the processor, the first and second carts located proximate the first shelf; and executing software stored on non-transitory media by the processor, to use the communicated additional cart data to cause the processor to determine a probability that the shopper that considered the product was associated with either the first or second cart.

In a yet further variation thereof, the method further comprises executing software stored on non-transitory media by the processor to determine the product type of the product contemplated by accessing data pertaining to products on the first shelf; and determine which shopper associated with the first and second carts considered the product, by comparing the product type of the contents of the first shelf with product types contained in each of the first and second carts, and increasing a probability that the shopper which considered the product is a shopper associated with a cart containing one or more products which correlate with the product type of the first shelf.

In an embodiment thereof, the product types contained within the first and second carts are determined after the first and second carts have checked out.

In a further of variation of the foregoing embodiment, the method further comprises executing software stored on non-transitory media by the processor to determine the product type of the product contemplated by accessing data pertaining to products on the first shelf; and determine which shopper associated with the first and second carts considered the product, by comparing the product type of the contents of the first shelf with product types historically purchased by shoppers associated with each of the first and second carts, and increasing a probability that the shopper which considered the product is a shopper associated with one of the first and second carts who has historically purchased product types which correlate with the product type of the first shelf.

In a variation thereof, a particular shopper is associated with a particular cart when a particular shopper performs at least one of selecting a particular cart or checking out with a particular cart.

In another embodiment of the disclosure, a method for obtaining shopping related data comprises detecting, by at least one shelf weight sensor connected to a first shelf, a reduction in weight, of a first weight amount, of product upon the first shelf; determining a first shelf time at which the reduction in weight by the first weight amount took place, by a timing device; detecting, by a cart weight sensor connected to a first shopping cart, an increase in weight upon the first cart; transmitting a signal from the first cart to at least one receiver having a known location; determining a first cart time at which the increase in weight upon the first cart took place, by a timing device; communicating shelf data including the detected reduction in first weight amount and first shelf time, by a control module associated with the first shelf, to an electronic processor; communicating cart data including the detected increase in first weight amount upon the first cart, and the first cart time, by a control module associated with the first cart, to the processor; receiving, by the processor, data pertaining to transmitted signal; and executing software stored on non-transitory media by the processor, to use the communicated shelf data, cart data, and transmitted signal, to cause the processor to determine a probability that a product has been moved from the first shelf to the first cart if the reduction in weight upon the shelf is the same as the increase in weight upon the cart, and if the transmitted signal indicates the first cart is within a predetermined distance from the first shelf, and to determine a consideration time before purchasing based upon the difference in time between the first cart time and the first shelf time, wherein the consideration time is about the time taken by a shopper to consider whether to purchase a product upon the first shelf.

In a variation thereof, the transmitted signal is analyzed by a receiver for a strength of the transmitted signal, the signal strength used to determine a distance between the cart and the receiver, the receiver being a known distance from the first shelf; and/or the transmitted signal is received by at least two receivers, the location of the cart determined by the processor based on the relative signal strength observed at each of the two receivers.

In a further embodiment of the disclosure, a system for obtaining shopping related data, comprises at least one shelf weight sensor connected to a first shelf and configured for detecting a reduction in weight, of a first weight amount, of product upon the first shelf; a first timing device configured for determining a first shelf time at which the reduction in weight by the first weight amount took place; a cart weight sensor connected to a first shopping cart configured for detecting an increase in weight upon the first cart; a second timing device configured for determining a first cart time at which the increase in weight upon the first cart took place; a shelf control module associated with the first shelf and including a processor and at least one of a wired or wireless communication device configured for communicating information from the shelf weight sensor and the first timing device; a cart control module associated with the first cart and including a processor and at least one of a wired or wireless communication device configured for communicating information from the cart weight sensor and the second timing device; and software stored on non-transitory media and executable by the processor to cause the processor to process the communicated information from the shelf and cart control modules to determine a probability that a product has been moved from the first shelf to the first cart if the reduction in weight upon the shelf is the same as the increase in weight upon the cart, and to determine a consideration time before purchasing based upon the difference in time between the first cart time and the first shelf time, wherein the consideration time is about the time taken by a shopper to consider whether to purchase a product upon the first shelf.

In variations thereof, the wired or wireless communication device of the cart control communicates information using a short range wireless protocol; and/or the system further includes a receiver configured to receive a signal from the communication device of the cart, the receiver configured to provide information pertaining to a signal strength of the received signal.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION OF THE DISCLOSURE

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

While loyalty card use and other types of shopper participation programs can provide useful data with respect to historical purchases and returns of a shopper at physical 'brick-and-mortar' store locations, other information is not captured and is lost, such as information pertaining to products that the shopper viewed or inspected, but did not purchase. Other lost information includes the time the shopper spent in making a decision whether to buy or not buy a particular product.

The disclosure enables obtaining such information, which is useful in detecting the degree of interest of a user in a product. The information enables store management to make more informed decisions regarding products to stock and more effectively targeted advertisements and recommendations. Additionally, the information enables the development of better shopper profiles for improved understanding of the interests of individual shoppers or populations of shoppers. The shopper benefits by being informed regarding products they are likely to be interested in, wherein recommendations are better tailored to their preferences.

In the prior art, while a subset of this information can be captured in a physical location, it requires the use of costly and undesirable methods, such as video recording shoppers, human observers, and customer surveys. In contrast, a wider range of shopper analytics data can be captured during online shopping, in the form of web page views, time spent on particular pages, click-throughs, and other such readily collected behavioral data.

This disclosure provides a non-invasive means of capturing the sometimes subtle data associated with shopping behavior, without requiring active participation of the shopper, human intervention, or the capture of unrelated personal information by monitoring all the activities of shoppers. The disclosure enables analysts to infer contextual shopping behaviors of users in physical retail stores using instrumented shopping carts and product shelves, described herein. These shopping behaviors represent a set of shopping analytics which enable the analysis of not only what a shopper has purchased, but also the items or services that the shopper appears to have considered, but did not buy for one reason or another.

More particularly, this disclosure enables measurement of a degree of interest of a shopper in a product, using weight sensors and a relative location of carts and stocking shelves. The analytics thus obtained enable additional information regarding, for example, the products that a shopper was interested in buying but didn't buy; the reason for not buying them; and the time that a shopper spent in deciding whether to buy a specific product.

Figure 1:
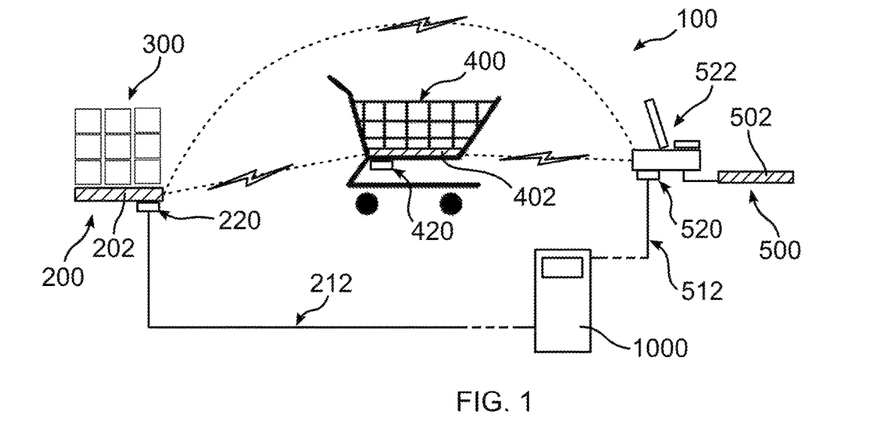
FIG. 1 depicts components comprising a system of the disclosure, including a shelf having a weight sensor and communications equipment, a cart including a weight sensor and a transmitter, a checkout system with a scale, and a server.

To carry out the foregoing system, and with reference to FIG. 1, components of a system 100 of the disclosure are depicted, and which include a support of any known form, such as a shelf, cubby, table, rack, pallet location, or tray, referred to hereinafter for convenience, simply, as shelf 200. The weight of product 300 is engaged, displayed, or otherwise supported by shelf 200 so that the weight of product 300 can be measured by a sensor 202 with sufficient accuracy to detect the addition or subtraction of a single saleable unit. Each shelf 200 communicates using a control module 220, each shelf 200 either having a dedicated control module 220, or a plurality of shelves 200 sharing a control module 220.

A weight sensor 202 determines a weight measurement of the product 300 supported by shelf 200. Such sensor 202 can be disposed along or within shelf 200, or an entirety of shelf 200 can be a sensor. Any known or hereinafter developed sensor technology can be used to determine weight upon shelf 200, including one or more strain gauges, load sensors, load cells, force sensors, pressure sensors, or other type of sensor which produces an output, whether analog or digital, which can be interpreted as weight. In an alternative embodiment, a structure supporting shelf 200, such as a brace or arm, can include a weight indicating sensor operative to indicate, exclusively, or in combination with other sensors, a current weight of product resting upon shelf 200.

Figures 1A, 2, 3:
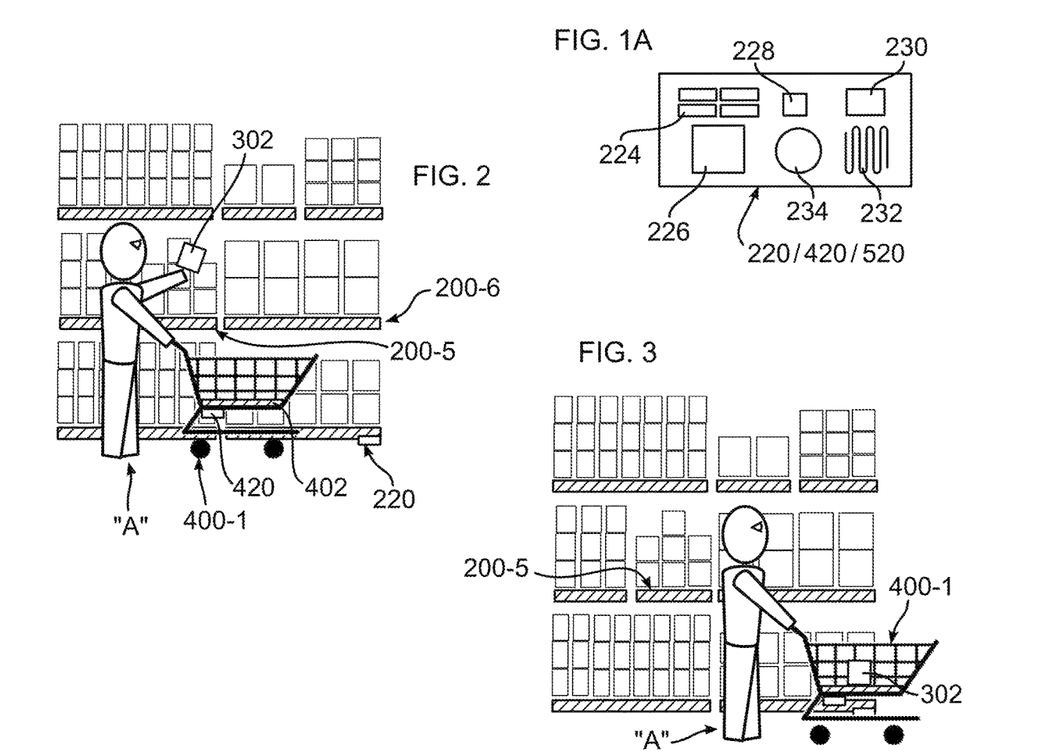
FIG. 1A depicts a control module that can be used with any of a shelf, cart, or checkout system of the disclosure.
FIG. 2 depicts a system of the disclosure including the components of FIG. 1, as well as a product display including shelves of the disclosure, and a cart of the disclosure in use by a shopper.
FIG. 3 depicts the system of FIG. 2, the shopper having selected a product from the display.

With reference to FIG. 1A, control module 220, 420, or 520 includes one or more electronic components, including components for storing or processing weight related data from sensor 202, such as a non-volatile memory 224, and processor or microcontroller 226. Data corresponding to a change in weight determined by sensor 202 can be signaled to control module 220 by polling, clock interrupt, or timer, for example, by corresponding circuitry 228. Alternatively, polling or other checking of current weight can be initiated after first detecting the presence of a person proximate a product display which includes shelf 200. Control module 220 includes a transmitter or transceiver 230 for communicating information to or with other components of system 100. In an embodiment, portions or all the transmitter, including for example an antenna 232, can be disposed external to control module 220. A battery 234 or power supply, and other suitable electronics as would be understood by one skilled in the art, can be included as part of control module 220, 420, or 520.

Control module 220 can additionally be connected to other components of system 100 using any other form of electronic communication, including for example a wired connection 212, which may form part of a network, such as a LAN or WAN, which can include wireless components. This may form a reliable connection, for example, for connecting shelves 200 which are stationary to server 1000 or any other stationary component of system 100. For shelves 200 which are able to move, a wireless connection, such as a WiFi connection, can be convenient.

In addition to the communication networks and protocols described elsewhere herein, communication between any of the components of system 100 described herein, can be carried out using cloud and/or non-cloud based technologies, wireless communication networks, non-cellular networks such as Wireless Fidelity (WiFi) networks, public networks such as the Internet, private networks, and/or the like. The wireless communication networks support any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication networks include one or more networks based on such standards. For example, in one embodiment, a wireless communication network comprises one or more of a Long Term Evolution (LTE) network, LTE Advanced (LTE-A) network, an Evolution Data Only (EV-DO) network, a General Packet Radio Service (GPRS) network, a Universal Mobile Telecommunications System (UMTS) network, and the like.

Further in accordance with the disclosure, a shopping cart, hand truck, tote, basket, or any other vessel for carrying selected products, hereinafter simply cart 400, contains and carries products selected by a shopper, consumer, or customer, hereinafter simply customer. Cart 400 includes a weight sensor 402 as described for sensor 202, for measuring the weight of products added to or removed from cart 400 while a customer is shopping. In the manner of sensor 202, a change in weight of the cart can be measured at the bottom of a basket, as shown in the figures, or can be measured elsewhere, such as at legs or wheels. Each cart is provided with a controller module 420 operative to process and transmit weight information as described herein. Cart 400 further includes a controller 420 and a transmitter, as described with respect to controller 220 and the transmitter of shelf 200.

A checkout system 500 includes a scale 502 which senses weight of products selected by a customer and placed thereupon for purchase. A point of sale (POS) control module 520 is provided, and a transmitter, as described with respect to controller 220 and the transmitter of shelf 200. Functions of control module 520 as described herein can be carried out by components of a point of sale system 522, whereupon a separate control module 520 is not needed. Alternatively, these functions can be shared between POS system 522 and a separate control module 520, or can be carried out completely by control module 520. As described for shelf 200, checkout system 500 can be connected by a wire 512.

Data transmitted to server 1000 is processed as described herein and communicated to customers of the data. The transmission can be by any known or hereinafter developed means, including any wired or wireless method currently known or hereinafter developed, whether long or short range, as appropriate to a particular distance to server 400, and means available. Server 1000 can include some or all of the components of information processing system 1102, described elsewhere herein. In an embodiment, there is no central server 1000, and data is processed using one or more of control modules 220, 420, and 520 described herein.

With reference to FIGS. 2-6, the aforedescribed components of system 100 are employed to provide shopping analytics as described herein. As illustrated in FIG. 2, customer "A" is inspecting a product 302 of interest, which "A" has removed from shelf 200-5. The change of weight in shelf 200-5 is sensed by a sensor 202 of shelf 200-5, and the sensor output is communicated to control module 220, in this embodiment located below a bottom shelf in the figures. Shelf 200-6, and a plurality of other shelves 200 are also connected to the control module 220, by any known means, including for example using a wired protocol, such as Ethernet, or a serial or CAN bus, or a wireless protocol, such as BLUETOOTH, WiFi, and NFC, or any other known or hereinafter developed method.

The suffix '-4', '-5', and '-6' appended to references for shelf 200 are indicative of a unique identification given to examples of particular shelves 200 within an operational system 100, as will be described further elsewhere herein.

When the weight upon a shelf 200, in this example shelf 200-5, is reduced by a predetermined weight, for example the weight of one or more saleable units, in this example product 302, a clock associated with shelf 200-5 or controller 220 notes a current 'start' time. As shown in FIG. 3, in one shopping scenario, product 302 is placed within cart 400-1. The suffix '-1' appended to the reference for cart 400 used by "A" is indicative of a unique identification given to carts 400 within an operational system 100, as will be described further elsewhere herein.

At a point in time, it may become known that cart 400-1 is associated with customer "A". For example, customer "A" may be asked to 'swipe' a magnetic 'loyalty' card or other ID when removing a cart 400 from a storage location. Similarly, either a loyalty card or other ID associated with a customer, such as a credit card, or any other identifying information can be used to associate a customer with a particular cart 400. In this manner, events associated with a weight placed into, or removed from, cart 400-1 can be associated with customer "A".

At this time, a clock associated with control module 420 of cart 400-1 notes a current 'stop' time when a product of a particular weight, sensed by sensor 402, has been placed within the cart. With exceptions as noted elsewhere herein, it may be inferred that product 302 has been selected by "A", after "A" considered product 302 for an amount of time that relates to the difference between the stop time and the start time. The actual consideration time further includes time spent viewing product 302 before removing it from shelf 200-5, less the time required to transfer product 302 into cart 400-1.

Inferences herein can take the form of a possibility or probability that an event occurred, for example the aforedescribed event, as determined by an electronic processor. The processor can assign weights or probability to the shopping events described herein, accumulating weightings and increasing probability, or deducting weightings and reducing probability, of the likelihood of one or more events having taken place, based upon a collection of related data, as communicated by shelves 200, carts 200, cart location devices, and checkout devices, as described herein. Probabilities can be assigned percentages or weights based upon past observed shopping events, as well as using models based upon statistics and other mathematical theories, as are understood by those skilled in the art.

In the foregoing scenario, and elsewhere herein, time can be measured using a twenty four hour clock, or by any other measure of time, for example pulses of an integrated timer chip, or a time value provided by a single source, shared among all communicating devices of system 100 using one or more communication protocols.

Figure 4:
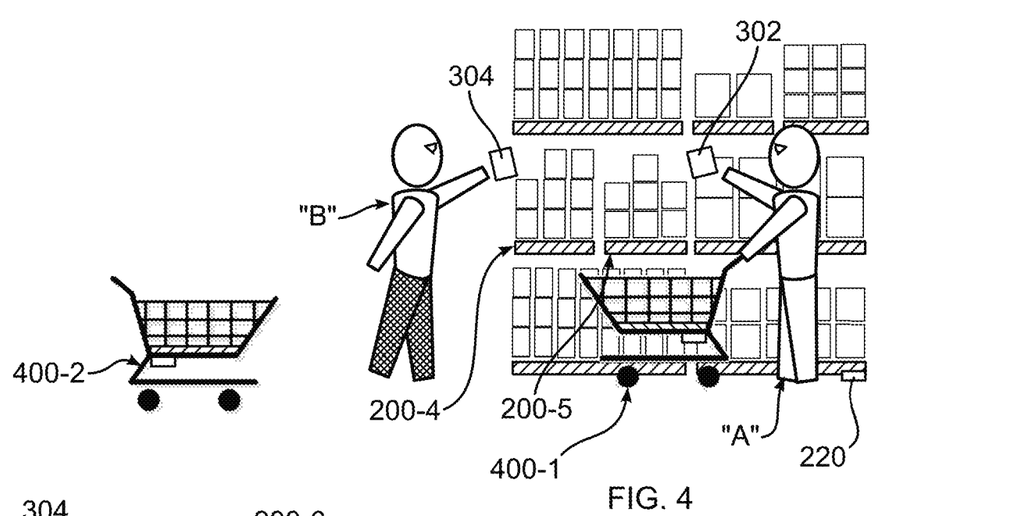
FIG. 4 depicts the system of FIG. 2, the shopper returning the product selected in FIG. 3 to the shelf, and another shopper selecting a product using a cart of FIG. 1.
Figure 5:
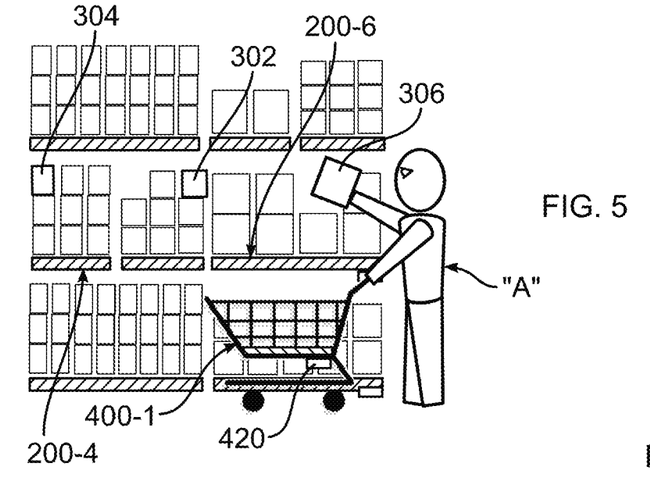
FIG. 5 depicts the system of FIG. 2, the shopper selecting an alternate product.
Figure 6:
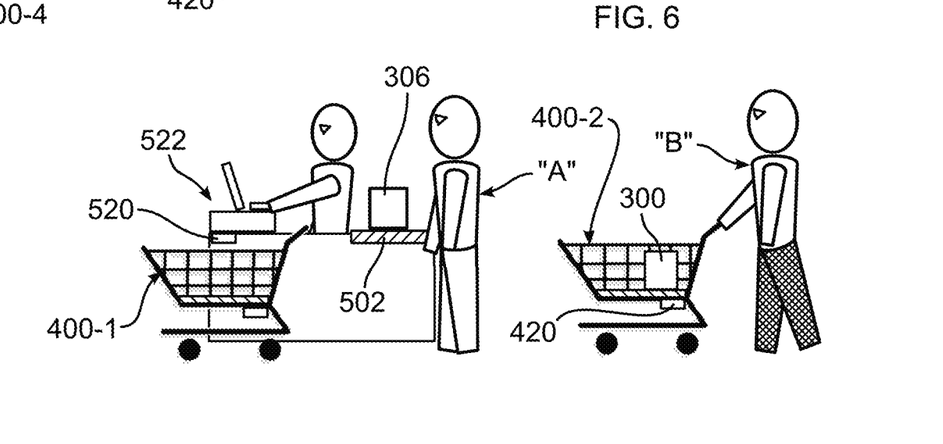
FIG. 6 depicts the system of FIG. 2, the shopper in line at a checkout system of the disclosure, the other shopper in line.

In FIG. 4, "A" has reconsidered the purchase of product 302, and has removed it from cart 400-1 and has placed it back onto shelf 200-5. Absent other considerations, discussed herein, it may be inferred that customer "A" is the customer that has replaced product 302 because cart 400-1, associated with customer 'A', has detected the removal of a weight corresponding to that of product 302 at a point in time that is close to the point in time that a product having a weight corresponding to product 302 is placed onto shelf 200-5. This inference can be made by a computer processor while customer 'A' is shopping, or at a later time, after data from shelf 200-5 and cart 400-1 has been collected for analysis. In FIGS. 5-6, it may be seen that customer "A" has returned product 302, and has instead removed product 306 from shelf 200-6 and placed product 306 into cart 400-1. The time during which product 302 may have been considered by customer "A" can be determined in the same manner as described for product 302, described with respect to FIGS. 2-3.

Also shown in FIG. 4, customer "B" removes product 304 from shelf 200-4, considers product 304, and then, without placing product 304 into her cart 400-2, customer "B" places product 304 back onto shelf 200-4, as shown in FIG. 4. It is known that product 304 was considered, because shelf 200-4 has detected that it was removed from a shelf 200. More useful analytics can be derived from knowing which customer considered product 304; however, because product 304 was not placed into any cart, there is no product detection from a cart with which to associate consideration of product 304 with a particular consumer. Accordingly one or more of the following methods of resolving ambiguities to identify the customer which considered a product without placing the product into her cart, and thereby clarify outlier data.

Weight/Time Correlation.

This has been described with respect to FIGS. 2-3. Specifically, when a product 300 of a particular weight has been removed from a shelf 200, and has been placed in a cart 400 within a relatively short period of time, it may be inferred that the customer associated with the cart 400 is the customer who considered the product.

In a scenario where two of the same product are removed from a shelf 200 close in time, but only one product is placed in a cart soon thereafter, and the other product is placed into a cart after a substantially longer period, it may still be known which customer considered for a longer period, as the start and stop times are resolved to a particular cart/customer combination, even if a customer is not associated with a cart until checkout.

To help resolve ambiguities, each cart 400 can communicate the time and weight of products placed within it to a common data storage location for analysis by a computer processor, whether at the time the product is placed in the cart, or at the time of checkout, or at other intervals. Similarly, location information for each cart 400 relative to other carts, or relative to particular shelves 200 or location within a shopping area, can be determined and stored for immediate or subsequent analysis.

Cart Location.

Each cart 400 can be provided with a transmitter or transceiver 230, as described. Accordingly, a location of a particular cart can be determined by measuring a signal strength of signal transmitted from a cart 400 to a receiver, for example a receiver located upon or proximate a particular shelf 200. Alternatively, a cart 400 can be requested to issue a signal by a received command, or a cart 400 can periodically transmit a signal, and a signal strength of this signal can be analyzed by a plurality of receivers to determine a location of cart 400 relative to each receiver, whereupon a location of the cart 400 can be mathematically determined. In an embodiment, a single shelf 200 can contain such plurality of receivers located on opposing sides of the shelf 200. Similarly, multiple shelves within a display region or area can be configured with receivers, and data from these receivers can be analyzed as described.

Other means besides signal strength can be used to determine a cart location, including for example using WiFi positioning (WiPS/WFPS) or the like, or GPS if outside, or detecting a weak identifying signal successively by a plurality of receivers throughout a shopping area. The number of receivers can be determined to provide sufficient granularity to distinguish carts 400 which are close to each other.

Customer Location.

It is possible to determine a location of a customer using location data provided by a customer's phone, such as location services data obtained by GPS or a triangulation method, or by providing a customer with a locating device. The other described methods are passive, and do not require any particular cooperation by the customer. However, this method may require active agreement or cooperation by the customer, for example downloading and executing an application on the customer's phone, or carrying a locating device. This method facilitates resolving ambiguities where a customer has left their associated cart 400 at a distance from a location where a product is considered.

Frequent Item-Set.

If it is desired to know if a particular product was considered by a customer associated with one cart or another, the contemplated and unresolved product can be compared with products in each cart to determine if there is a complementary product in only one of the carts. A simple example would be butter in one cart, where the product considered but returned without being placed in a cart is bread. The stronger the correlation between products, the higher the confidence of a matching cart.

Profile Information.

Information may be known about the buying history or habits of customers involved in an ambiguity. It can be inferred that the customer who likely considered a particular type of product is one who, with respect to all of the potential considering customers, uniquely considered that product type in the past. Similarly, a relative probability can be inferred where all customers have previously purchased a product, based on a frequency of prior purchases, or other purchasing habits, such as the day of the week.

Customer Survey.

Customers that the data suggests may have considered and rejected a product can be asked, for example during checkout or by a later email, if they had indeed considered a particular product, and if so, why they decided not to purchase.

Deductive Reasoning.

Ultimately, the activities associated with a particular customer may be resolved to a reasonably high level of certainty using various methods described herein. Accordingly, an ambiguity involving that particular customer is resolved with respect to the other customer by the process of elimination. In some cases, this analysis can only be concluded when all customers and carts involved in the ambiguity have completed a checkout. In a variation thereof, where only one customer involved in an ambiguity ultimately purchased the type of product involved in the ambiguity, it may be deduced that this was the customer considering the rejected product.

In a further variation, system 100 may observe that a product from shelf 200-4 was removed, then replaced. Additionally, system 100 may observe that cart 400-1 was closest to shelf 200-4. However, at a point close in time, system 100 observes that a product corresponding to shelf 200-6 is placed in cart 400-1. From this it may be inferred that the customer associated with cart 400-1 was not actually close to shelf 200-4, and that perhaps another customer considered the product on shelf 200-4. This inference can be strengthened if, during check-out, another cart 400 which was nearby is found to contain a similar product type to the product that was considered and replaced on shelf 200-4.

Any or all of the foregoing methods of resolving ambiguities, or disambiguating, can be combined to increase confidence regarding which customer considered a particular product and for how long.

In FIG. 6, customer "A" checks out, placing purchased products upon sensor 502 of shelf 500, which may have the form of a conveyor or check-out scale, for example, where they are weighed. The purchased products are associated with customer "A" as described herein, and the weight information can be used to resolve ambiguities regarding whether or a product, for example product 302, was considered by customer "A" or another customer. Additionally, the identification of the product within cart 400-1 can be rendered unambiguous, at least insofar as the checkout process is accurate, by scanning bar codes of products and associating the bar codes with the weight of the product scanned. In an embodiment, not all product from a cart is weighed, as the bar code for the product can be correlated with the product's weight. In FIG. 6, customer "B" has purchased other product 300, and not product 304, which was returned to shelf 200-4, as described above.

Figure 7:
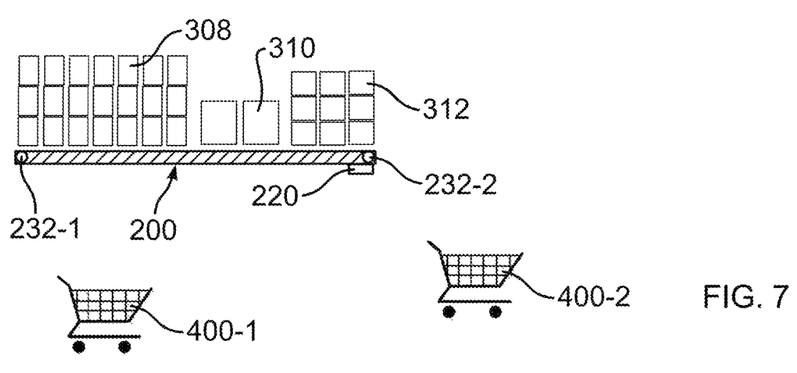
FIG. 7 depicts an alternative product display of the disclosure, including a shelf containing varied products, and electromagnetic wave receivers positioned upon the shelf.

As shown in FIG. 7, a single shelf 200 can hold or support different products, illustrated as products 308, 310, and 312 in this example, provided these different products can be distinguished by their respective weights. In this manner, the particular product removed from shelf 200 can be deduced based upon the change in weight of all product on shelf 200, in view of the possible weights of each product type that is placed upon shelf 200.

As can additionally be seen in FIG. 7, an antenna 232 can be placed on opposites ends of shelf 200 to facilitate determine a location of carts relative to shelf 200. More particularly, cart 400-1 will return a weaker signal strength when measured using antenna 232-2 than when measuring with antenna 232-1, and the opposite result will be obtained from cart 400-2, enabling system 100 to deduce the relative locations of carts 400-1 and 400-2, and to further develop inferences as to which cart and customer were associated with returning product to shelf 200 without placing it in a cart. For example, within a given shelf 200, there can be multiple sensors 202, whereby it is determinable from which portion of a shelf 200 product has been removed or replaced. Alternatively, there can be multiple shelves 200 which may or may not contain the same product. In this manner, the location of a particular sensor can be correlated with the location of the closest cart to create an inference of which customer considered a product based upon their associated cart 400.

Accordingly, the present disclosure provides a method and system associated with temporal and spatial correlation methods to enable gray labelling, which is an indication of how close a product is to being sold. The method can be carried out without any active participation of the consumer aside from normal shopping activities, providing thereby, a 'passive' system. The disclosure uses 'smart' carts and shelves 400, 200 equipped with weight sensors, indoor localization, synchronized clocks and short range communication between each other and a checkout counter computer system 500. Any of the control modules associated with the carts 400, shelves 200, or checkout system 500 can carry out processing to analyze shopping data as described herein, or alternatively, a computer system associated with the checkout system 500, or a separate server 1000, can perform the computational analysis. The temporal and spatial correlation methods described herein can be carried out using only weight and location sensor data to infer very detailed contextual shopping behavior.

A system 100 of the disclosure cognitively develops reasoning relating to products customers did not buy, the reason for not buying them, and the time that each customer spent in deciding whether to buy a specific product. Additionally, the present disclosure provides methods to disambiguate and appropriately resolve between multiple possible customers considering product of the same weight from nearby locations using only the shelves 200 and shopping carts 400, and in embodiments using any of historical shopping information, frequent item-set information, and indoor localization, without any requirement of video recording or monitoring customers while they are shopping.

The disclosure determines a 'consideration' time, which is the amount of time a consumer or customer considers a product before buying or leaving it. The consideration time can include data pertaining to multiple times during which a customer picked up a product to consider it, and returned it to a shelf, either during the same shopping event, or at separate shopping events. An engagement of a given customer with a set of given products can then be determined, using the collective set of movement dynamics of products from and to the customer's shopping cart from product shelves. With this data, it is possible to infer a level of 'sold'-ness of a product to a customer. This further enables building of a product profile which indicates an amenability of the product to being sold rather than sold/not sold (black/white), which can be quantified, for example, as 25%, 50%, 90%, or any percent sold (grey).

The product profile can include factors such as (a) the customer's typical 'consideration time', determined according to the disclosure, (b) a characteristic history of a customer to buy a product, and (c) the 'consideration time' seen as a characteristic trend for the product type by all customers/prospective buyers.

In accordance with one embodiment of the disclosure, an example shopping 'flow' pattern can occur as follows:
1. A customer enters a shopping mall.
2. The customer picks a shopping cart 400, wherein every cart 400 has a unique ID. Each shopping cart has a weight sensor which indicates the total weight of products carried by the cart.
3. Store product displays have smart shelves 200 that contain or support the products. Every shelf 200 has a shelf ID. A shelf 200 can only have one product of a particular weight, or the shelf can carry multiple products if the weight of each different product is different, so that the products can be distinguished by their weight. A product can be identified in this manner not only by its weight, but by the shelf ID which is communicated to other components of system 100 by shelf 200 or its associated control module 220. Every shelf has a weight sensor which can communicate the total weight of the products contained or supported within it.
4. Using for example indoor localization techniques or any other localization technique disclosed herein, a central server in the store or shopping mall knows the location of any carts being used by a customer.
5. The central server also knows the location of the shelves with respect to a shelf ID.
6. With the foregoing information, the central server 1000 is aware of the relative location of carts 400 and shelves 200.
7. Carts 400 and shelves 200 send weight sensor output at predetermined time intervals to the central server 1000.
8. When a customer removes a product and places it back on a shelf 200, the weight of the shelf decreases by a value X and then increases by the same value X after t seconds, where X refers to the weight of the product on shelf 200, and t refers to the time that the customer spends in thinking whether to buy the product or not, and finally decided not to buy the product. This represents the 'consideration time' before abandoning the product purchase.
9. When a customer removes a product from shelf 200, and places it in her cart 400, then the weight upon shelf 200 decreases by X and the weight of the cart increases by X after t seconds, here, t refers to the time that the customer spent considering and deciding to buy the product.
10. By correlating time with weight displacements as disclosed herein, it is possible to resolve ambiguities and/or reduce the probability of error where multiple customers are selecting products in the same shelf area. Since the central server knows the location of carts and shelves, by correlating the weight displacements between cart and shelf in the same location, the software can provide a better prediction.
11. Data derived from steps 8 and 9, above, can show, for example, that a customer using a particular shopping cart showed interest in products x, y, and z, but bought only products x and y, and not z. Additionally, it can be inferred that the customer took t1, t2, and t3 seconds to make a decision with respect to each product x, y, and z, respectively.
12. While the customer pays for the product at checkout, observations from steps 8 and 9 can be associated with activity of the cart the customer was using, for example by associating the cart/shelf/product/time data with a unique ID of the customer, derived from credit card details, the use of a loyalty card, or other identification. In this manner, a running history of the purchasing history and habits of the customer can be maintained, and can be used to improve predictions when ambiguities arise as described herein. In an embodiment, the customer can load and run an application in a handheld computing device which can associate a cart with the customer. For example, the customer can enter a cart number, or alternatively, system 100 can determine that the cart and handheld computing device are associated since their movements track together. Once it is known where the customer is located while shopping, real time coupons and shopping assistance can be provided to the customer, and can be based at least in part upon the customer's shopping history.
13. After shopping has been completed, a more in-depth analysis can be carried out regarding individual customer shopping habits, as well as collective shopping habits of all customers visiting a particular shopping facility, or any group of shopping facilities. This can include profiling of customers and the product types and brands they prefer. Servers can analyze such purchase history and infer various shopping related profiles such as one or more customers (i) prefer good quality products, (ii) prefers low cost products, (iii) products with discounts, or any other product attributes.

14. By correlating the customer profiles in step 13 above, with the history of a particular customer, servers of the disclosure can infer one or more probable reasons for not buying a particular product. For example, where a customer was interested in a particular product Z but did not buy it, and if (a) a profile for the customer suggests the customer prefers products with lower cost than product Z, and (b) product Z is a branded product with high cost, then the server can infer that the customer did not buy product Z due to its relatively high cost.

15. The data and inferences such as are described in the foregoing step collectively enable an analytics engine which can produce inferences for a single customer as well as aggregate inferences for a community of customers. Some of the questions the analytics engine can answer include: during what times of the day, week, and year that particular items were considered but not purchased; what was the price of an item when customers bought the item quickly as opposed to only after considerable thought; at what price point do customers decide not to buy the item; and what were competing item prices at that time a decision not to purchase was made. Information of this nature can help understand the reasons why customers thought longer, or ultimately decided not to make a purchase.

Figure 8:
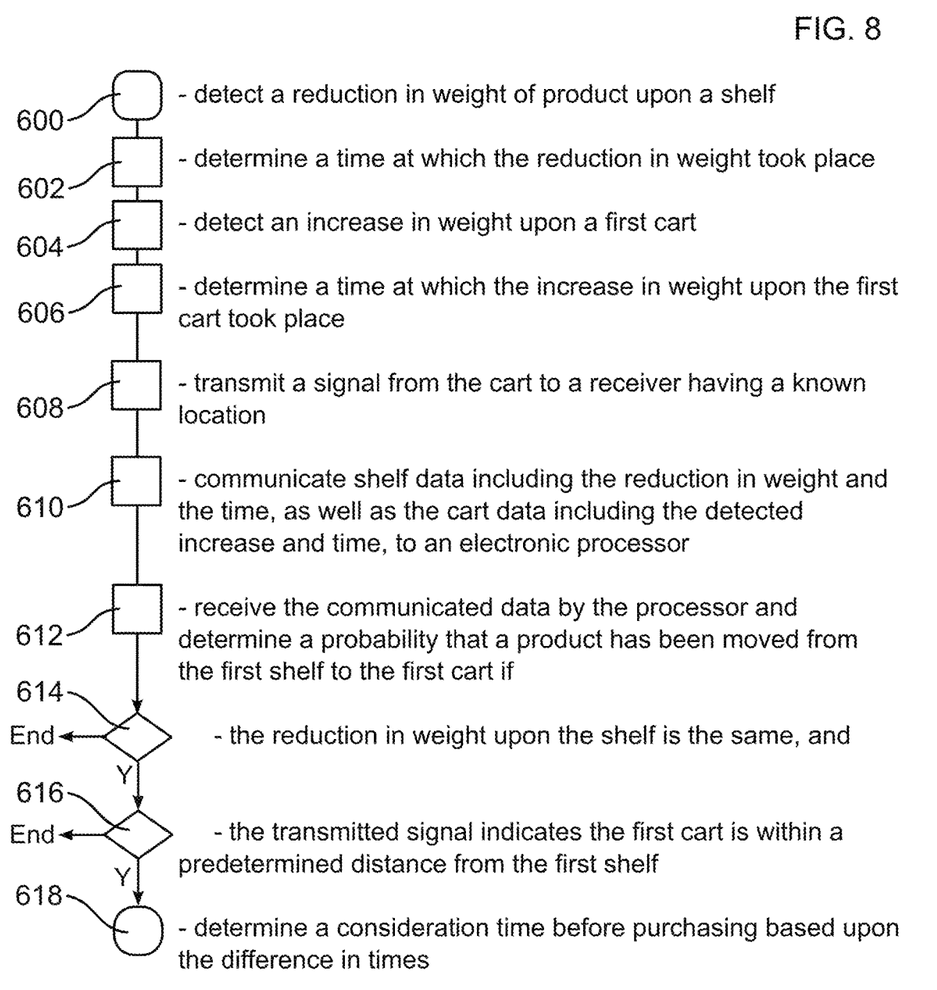
FIG. 8 depicts a flow chart of a method of analyzing shopping behavior in accordance with the disclosure.

FIG. 8 illustrates one possible flow path in accordance with the disclosure. In the following steps, the corresponding action is taken by system 100: 600, detect a reduction in weight of product upon a shelf; 602, determine a time at which the reduction in weight took place; 604, detect an increase in weight upon a first cart; 606, determine a time at which the increase in weight upon the first cart took place; 608, transmit a signal from the cart to a receiver having a known location; 610, communicate shelf data including the reduction in weight and the time, as well as the cart data including the detected increase and time, to an electronic processor; 612 receive the communicated data by the processor and determine a probability that a product has been moved from the first shelf to the first cart if: 614, the reduction in weight upon the shelf is the same; and 616, the transmitted signal indicates the first cart is within a predetermined distance from the first shelf; then 618 determine a consideration time before purchasing based upon the difference in times.

Accordingly, the instant disclosure provides analytical data, or analytics, which enable a determination of how long a customer picked up and examined or considered an item before putting it back; how long the customer thought about a product before putting it in their cart;

how many times did a customer pick up a product and put it back on a shelf; and how many times did a customer put a product into their cart and remove it. Data is additionally obtained regarding the times of the year that products were considered, rejected, or purchased, as well as the time of the day, day of the week, and a description of the items, including the price at which the products were considered. Data derived using system 100 further enables an analysis of when customers bought items quickly as opposed to spending substantial amounts of time thinking about them; the price points at which customers tended to reject items after consideration; and the prices of competing items at the time the consideration of a product took place. This data informs an understanding of why customers purchased particular items, rejected items, or spent considerable time in thought before making a purchase. The data can further provide insights as to why customers were not interesting in buying product; how close they came to making a purchase; and what to advertise to which customers on subsequent shopping occasions.

Figure 9:
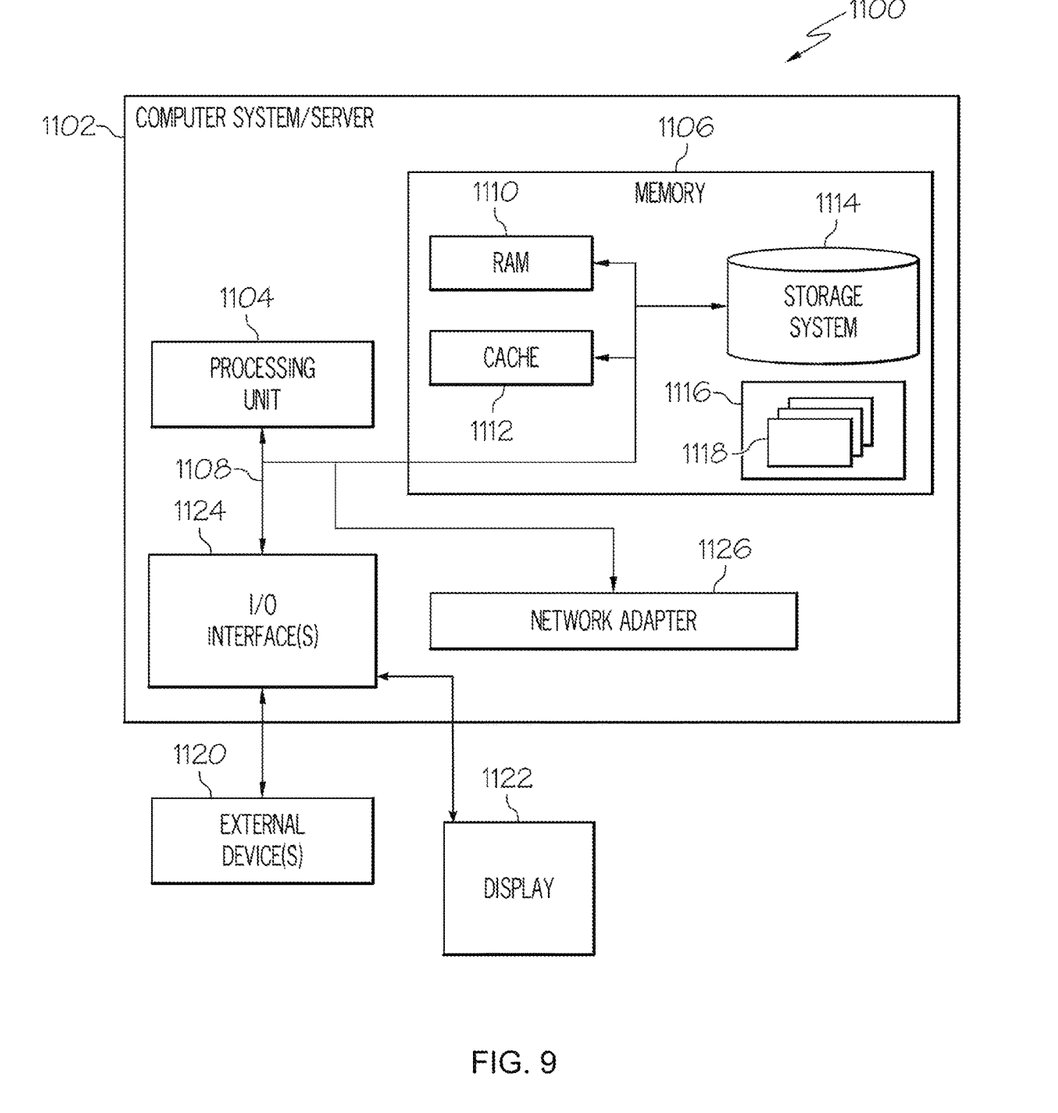
FIG. 9 depicts a computing system containing components, some or all of which are useable in order to carry out the disclosure.

Referring now to FIG. 9, this figure is a block diagram 1100 illustrating an information processing system that can be utilized in embodiments of the present disclosure. The information processing system 1102 is based upon a suitably configured processing system configured to implement one or more embodiments of the present disclosure (e.g., server 1000). Any suitably configured processing system can be used as the information processing system 1102 in embodiments of the present disclosure. The components of the information processing system 1102 can include, but are not limited to, one or more processors or processing units 1104, a system memory 1106, and a bus 1108 that couples various system components including the system memory 1106 to the processor 1104.

The bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 9, the main memory 1106 includes the order manager 116, logistics manager 126, communication manager 138, their components, and the various types of data 118, 120, 122, 128, 130, 132, shown in FIG. One or more of these components 120 can reside within the processor 1104, or be a separate hardware component. The system memory 1106 can also include computer system readable media in the form of volatile memory, such as random access memory (RAM) 1110 and/or cache memory 1112. The information processing system 1102 can further include other removable/non-removable, volatile/non-volatile computer system storage media. By way of example only, a storage system 1114 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1108 by one or more data media interfaces. The memory 1106 can include at least one program product having a set of program modules that are configured to carry out the functions of an embodiment of the present disclosure.

Program/utility 1116, having a set of program modules 1118, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. Program modules 1118 generally carry out the functions and/or methodologies of embodiments of the present disclosure.

The information processing system 1102 can also communicate with one or more external devices 1120 such as a keyboard, a pointing device, a display 1122, etc.; one or more devices that enable a user to interact with the information processing system 1102; and/or any devices (e.g., network card, modem, etc.) that enable computer system/server 1102 to communicate with one or more other computing devices. Such communication can occur via I/O interfaces 1124. Still yet, the information processing system 1102 can communicate with one or more networks such as a local area network (LAN), a general wide area network (WAN), and/or a public network (e.g., the Internet) via network adapter 1126. As depicted, the network adapter 1126 communicates with the other components of information processing system 1102 via the bus 1108. Other hardware and/or software components can also be used in conjunction with the information processing system 1102. Examples include, but are not limited to: microcode, device drivers, redundant processing units, external disk drive arrays, RAID systems, tape drives, and data archival storage systems.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system for obtaining shopping related data, comprising:
    at least one shelf weight sensor connected to a first shelf and configured for detecting a reduction or increase in weight, of a first weight amount, of product upon the first shelf;
    a first cart weight sensor connected to a first shopping cart ("first cart") configured for detecting an increase or decrease in weight upon the first cart;
    a second cart weight sensor connected to a second shopping cart ("second cart") configured for detecting an increase or decrease in weight upon the second cart;
    a first cart wireless communication device associated with the first cart configured to communicate first cart weight information;
    a second cart wireless communication device associated with the second cart configured to communicate second cart weight information;
    a first shelf wireless communication device associated with the first shelf configured to communicate with the first cart wireless communication device and the second cart wireless communication device;
    a non-transitory storage medium storing processor executable software instructions, which when executed by a processor cause the processor to process information communicated by the first shelf wireless communication device, the first cart wireless communication device, and the second cart wireless communication device to determine
    (a) a probability that a product has been moved between the first shelf and the first cart when the reduction or increase in weight upon the first shelf is the same as the increase or decrease in weight upon the first cart;
    (b) a probability that a product has been moved between the first shelf and the second cart when the reduction or increase in weight upon the first shelf is the same as the increase or decrease in weight upon the second cart;
    (c) a probability that a product was considered by a shopper associated with the first cart and not a shopper associated with the second cart based on a signal strength of communication transmitted from the first cart wireless communication device to the first shelf wireless communication device is stronger than a signal strength of communication transmitted from the second cart wireless communication device to the first shelf wireless communication device when
        (i) a weight of the product was removed from the first shelf and a corresponding weight was returned to the first shelf as determined by using the at least one shelf weight sensor connected to the first shelf,
        (ii) during the time the weight of the product was removed from the first shelf, no weight corresponding to the product was placed in the first cart or the second cart as determined by using the first and second cart weight sensors; and
    in response to the probability that a particular shopper associated with one of the first cart and second cart removed a product from a shelf, initiating a marketing or sales decision related to the particular shopper.

2. The system of claim 1, wherein the first cart wireless communication device and the second cart wireless communication device communicate information using a short range wireless protocol.

3. The system of claim 1, wherein the processor forms part of a central server.

4. The system of claim 1, wherein determining a probability that a product has been moved between the first shelf and the first cart further includes determining a location of the first cart based upon the processor using location data provided by a mobile phone of a shopper associated with the first cart.

5. The system of claim 1, wherein the distance between the first shelf wireless communication device and the first shelf is a known distance.

6. The system of claim 1, wherein video data of shoppers is not used, and the first cart is associated with a first shopper and the second cart is associated with a second shopper.

7. The system of claim 6, wherein determining a probability that a product has moved from the first cart and not the second cart further includes comparing product types historically purchased by the first shopper and the second shopper.

8. The system of claim 1, further including a timer associated with the first shelf weight sensor, the timer used to determine a consideration time as the time between a reduction in weight of the first amount and the time in an increase in weight of the first amount.

9. The system of claim 1, further including a second shelf wireless communication device associated with the second shelf configured to communicate, and further including determining (d) a probability that a product has moved from the first cart and not the second cart by comparing the signal strength of transmissions between the first cart wireless communication device and the first and second shelf wireless communication devices to the signal strength of transmissions between the second cart wireless communication device and the first and second shelf wireless communication devices.

10. The system of claim 1, wherein the first shelf wireless communication device periodically communicates with each of the first and second cart wireless communication devices to determine a location of each of the first and second carts using signal strength of the periodic communications.

11. The system of claim 1, wherein the first and second shelf wireless communication devices periodically communicate with each of the first and second cart wireless communication devices to determine a location of each of the first and second carts using signal strength of the periodic communications.

12. The system of claim 1, wherein the first shelf wireless communication device is positioned proximate the first shelf.

13. The system of claim 1, wherein the first shelf wireless communication device includes a plurality of receivers.

\* \* \* \* \*